July 14, 1953 — J. L. ELAM — 2,645,267
COLLISION UNIT

Original Filed Dec. 9, 1950 — 3 Sheets-Sheet 1

Inventor:
Jess L. Elam
By: Wallace and Cannon
Attorneys

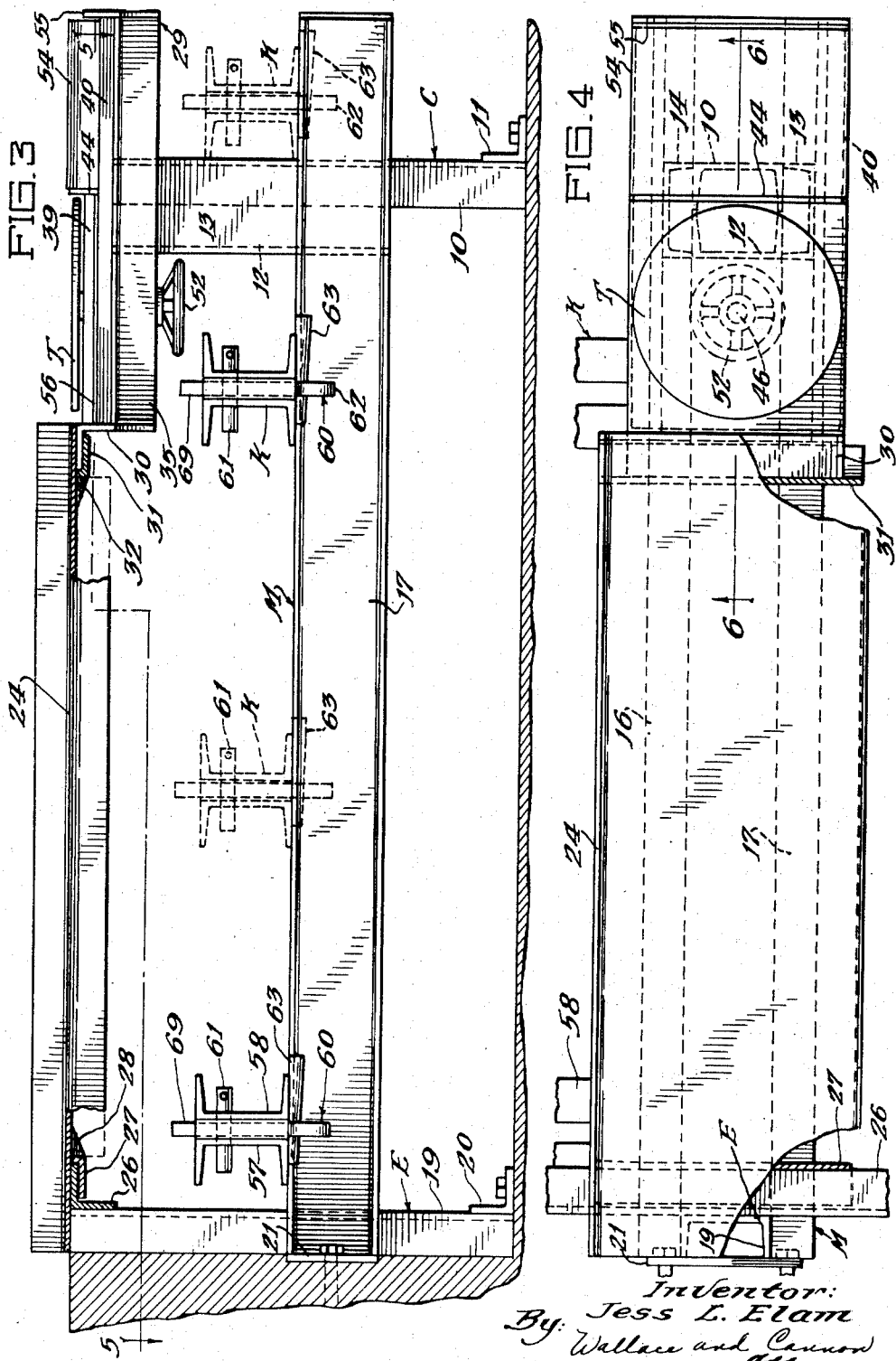

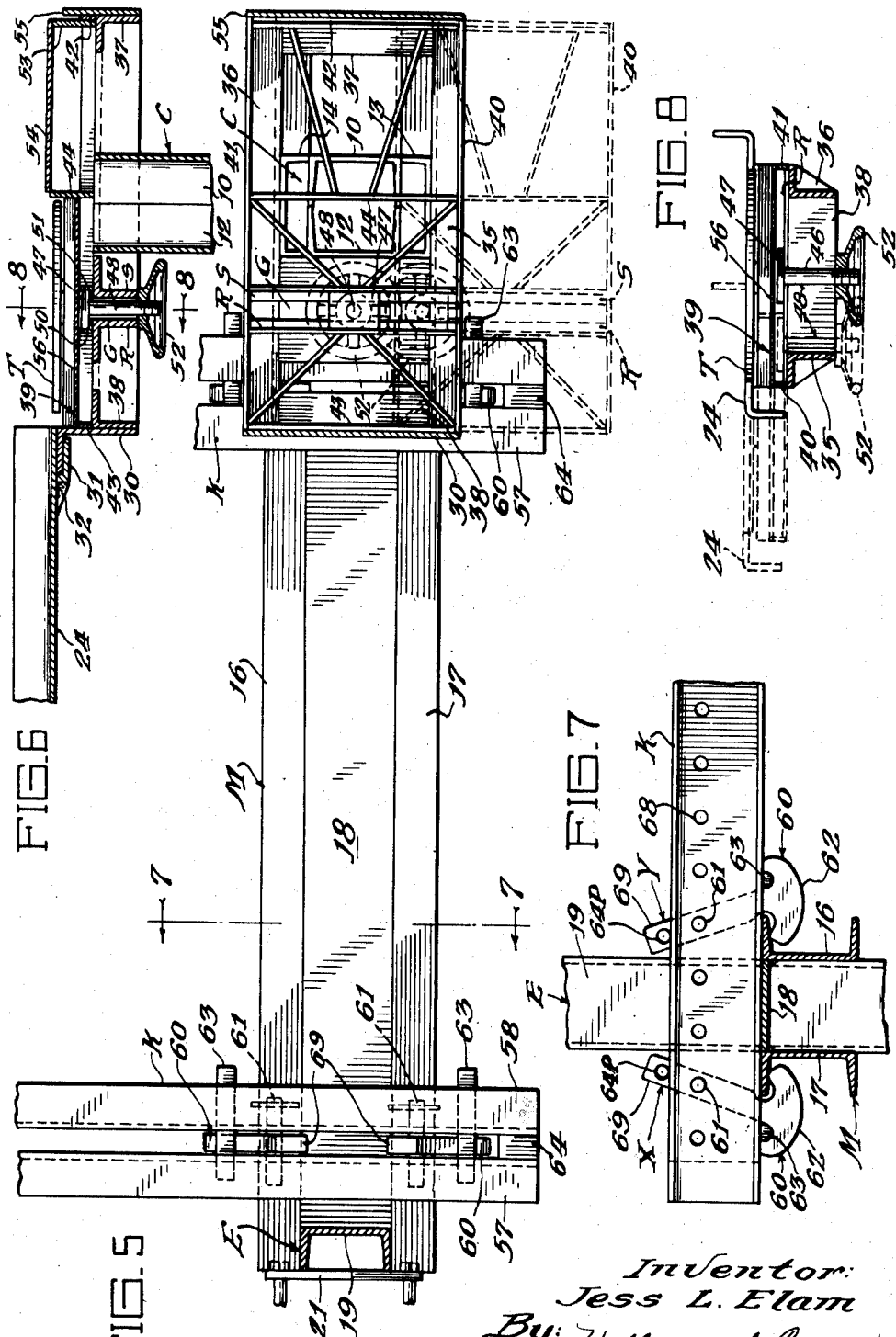

Patented July 14, 1953

2,645,267

UNITED STATES PATENT OFFICE 2,645,267

COLLISION UNIT

Jess L. Elam, Chicago, Ill., assignor to Builders Ornamental Iron Company, Chicago, Ill., a corporation of Illinois Original application December 9, 1950, Serial No. 200,005. Divided and this application September 26, 1951, Serial No. 248,391

5 Claims. (Cl. 153—32)

This application is a division of my co-pending application, Serial No. 200,005, filed December 9, 1950.

This invention relates to an apparatus for straightening the frames, axles and related devices of automotive vehicles and the like.

The apparatus of this kind that has been used heretofore has included elongated runways onto which the vehicle could be passed to be supported while work was performed thereon, the apparatus disclosed in the United States patent to Scherer No. 2,008,929, being typical of such apparatus. Such apparatus required considerable floor space in the garage or the like where it was employed and was subject to other objections. Therefore, an important object of my invention is to provide a novel apparatus of the aforesaid character that will require relatively little floor space in a garage or the like, and an object ancilliary to this is to provide an apparatus of the aforesaid character that may be mounted in a pit in such a way that the marginal portions of the floor about the pit may be utilized for supporting at least a part of the automotive vehicle upon which work is to be performed.

Among the objects of this invention are to provide a suitable support for devices that are employed when the camber and toe-in and the like of the front wheels of an automotive vehicle are to be adjusted so that such wheels will be properly supported when the adjustment is to be effected; to afford a platform on which toe-in gauges or the like may be mounted; and to afford clamping arrangement which will effectively clamp cross members of an apparatus of the aforesaid character to the side frame members thereof, and an object ancillary to this is to utilize a removable arrangement of this character; to so arrange an apparatus of the aforesaid character that a cross member such as that disclosed in my co-pending application, Serial No. 200,004, filed December 9, 1950, may be mounted directly beneath the front axle of an automotive vehicle when the front wheels of such a vehicle are disposed on the supports provided therefor in my apparatus; and to provide an apparatus of the aforesaid character that is of simple and economical construction and which will be efficient and positive in operation.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 3 is a vertical side view taken substantially on the line 3—3 on Fig. 1;

Fig. 4 is a plan view of one side of my novel apparatus, this view being drawn to a larger scale than Fig. 1;

Fig. 5 is a plan view taken substantially on the line 5—5 on Fig. 3;

Fig. 6 is a fragmentary vertical sectional view taken substantially on the line 6—6 on Fig. 4;

Fig. 7 is a fragmentary detail view taken substantially on the line 7—7 on Fig. 5; and Fig. 8 is a sectional detail view taken substantially on the line 8—8 on Fig. 6.

My novel apparatus as illustrated in the accompanying drawings, is intended to be used in a pit as P, the apparatus being mounted on this pit in such position as to have the runways thereon, which are described hereinafter, in horizontal alignment with the marginal portion of the floor about the pit P.

As shown, my apparatus includes two spaced apart side frame members M and N which have the forward end portions thereof supported by the columns C and D which are described in detail hereinafter. As best shown in Figs. 5 and 7, the side frame member M at the right-hand side of my apparatus, as it is viewed in Fig. 2, comprises two channel iron members 16 and 17 which have the flanges thereof directed outwardly. A plate 18 is welded or otherwise suitably secured to adjacent faces of the channels 16 and 17 at the upper edges thereof and extends substantially throughout the length of these channels.

Figure 2:
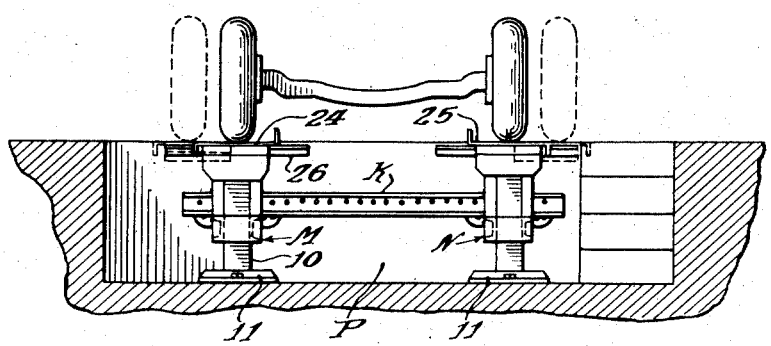
Fig. 2 is a vertical front view taken substantially on the line 2—2 on Fig. 1.

The column C is disposed between the channel members 16 and 17 inwardly of the forward ends thereof and this post includes an upright channel iron member 10 which is fitted between and welded to adjacent faces of the members 16 and 17 inwardly of the forward ends thereof. As best shown in Fig. 2, the channel 10 extends from the bottom of the pit P upwardly above the channel members 16 and 17 to the top of the column C. A shoe 11 at the lower end of the channel 10 is bolted or otherwise suitably secured to the bottom of the pit P. The column C also includes a channel iron member 12 which also extends between adjacent faces of the channels 16 and 17, this channel 12 extending from the lower edges of the channel members 16 and 17 to the top of the column. As in the instance of the channel 10, the channels 16 and 17 are respectively welded to adjacent portions of the channel member 12. As best shown in Fig. 5, the flanges of the channels 10 and 12 respectively extend toward each other but terminate in spaced relation one with the other. The column also includes two additional upright channel irons 13 and 14 which have the flanges thereof directed toward each other. The lower end of the channel 13 is welded or otherwise suitably secured to the upper edge of the channel member 17 and the flanges thereof respectively extend to and are welded to portions of the channel members 10 and 12. The flanges of the channel member 14 extend to and are also welded to portions of the channels 10 and 12 and the lower end thereof rests on and is welded to the upper edge of the channel 16.

The rear ends of the side frame members 16 and 17 are supported by another column E which comprises an upright channel 19, Fig. 5, that is disposed between and welded to adjacent faces of the channel members 16 and 17 at the rear ends thereof. This channel 19 includes a shoe 20 at the lower end thereof which is bolted or otherwise suitably secured to the bottom of the pit P. A bracket 21 is welded or otherwise suitably secured to the channel 19 and this bracket is bolted or otherwise suitably secured to the rear vertical wall of the pit P.

The side frame member N is similar to the above-described side frame member M and has a column D adjacent to the forward end thereof, this column corresponding to the hereinabove described column C. The column D therefore includes a channel member 15 which corresponds to the channel member 10 and which has a shoe at the lower end thereof that is bolted or otherwise suitably secured to the bottom of the pit P. The rear end of the side frame member N is supported by a column F comprising a channel corresponding to the channel 19. The member N also embodies two channel iron members 22 and 23 which correspond to the members 16 and 17.

The runways on which an end of an automotive vehicle is supported when work is to be performed on the vehicle are afforded by bridge plates 24 and 25 that are respectively slidably supported above and on the side frame members M and N. The bridge plates are mounted for slidable movement in a manner described presently in order that automotive vehicles having treads of varying widths may be associated with my novel apparatus. In the art to which the present invention pertains, the tread of an automotive vehicle is understood to be the distance between the vertical center plates of opposite wheels of the vehicle, such as the wheels at opposite ends of an axle. In Fig. 2 I have shown the bridge plates 24 and 25 in full lines in what may be called the intermediate positions thereof. Each of these bridge plates may be slid along the supports therefor in an outward direction and ultimately into the broken line position thereof shown in Fig. 2. When the vertical center planes of the side frame members are spaced apart approximately fifty inches and the bridge plates are moved outwardly to the outermost positions thereof, they are spaced apart sufficiently to enable a vehicle having a tread of as much as seventy-one inches in width to be supported on the runways afforded by the bridge plates. The bridge plates are also movable inwardly from the aforesaid intermediate position thereof to an inner position like that shown in broken lines in Fig. 8. When the vertical center planes of the side frame members are spaced apart as aforesaid and each of the bridge plates is disposed in the innermost position thereof, then an automotive vehicle having a tread of only forty inches in width may be supported on the runways. It will be understood that the bridge plates 24 and 25 may be disposed in any positions intermediate the outermost and innermost positions so as to thereby be disposed in a position to have opposite wheels of a vehicle respectively passed thereonto preferably substantially midway between the side edges of each of the plates.

The bridge plate 24 is supported for sliding movement by the angle irons 26 and 30, Fig. 4. The angle iron 26 is welded or otherwise suitably secured to the upper end of the channel 19, to extend transversely and on opposite sides of this channel. The channel 30 is supported from the inner side of a frame generally indicated by 29 that is fixedly supported at the upper end of the column C as will be described presently.

In order to connect the rear end of the bridge plate 24 to the angle iron 26 for slidable movement therealong, an angle iron 27 is welded or otherwise suitably secured to the lower face of the rear marginal portion of the bridge plate 24. The horizontal flange of the angle iron 27 is disposed beneath the horizontal flange of the angle iron 26, as shown in Fig. 3, and desirably adjacent faces of these horizontal flanges are slidingly engaged one with the other. Gussets as 28 are provided to reinforce the angle iron 27. Another angle iron 31 is welded or otherwise suitably secured to the lower face of the front marginal portion of the bridge plate 24 and the horizontal flange thereof is disposed beneath the horizontal flange of the angle iron 30 in such a way that the adjacent faces of these horizontal flanges are in sliding engagement one with the other. Gussets as 32 serve to reinforce the angle iron 31.

When the bridge plate 24 is moved to the aforesaid outermost position thereof, substantially one-half of the horizontal flanges of the angle irons 27 and 31 respectively remain in engagement with the horizontal flanges of the angle irons 26 and this insures against canting of the bridge plate when the wheel of an automotive vehicle is run thereonto. Likewise, when the bridge plate 24 is moved to the inwardmost position thereof shown in Fig. 8, then again substantially one-half of the length of the horizontal flanges of the angle irons 27 and 31 respectively remain in engagement with the horizontal flanges of the angle irons 26 and 30, and this is effective to prevent canting of the bridge plate 24 when the wheel of an automotive vehicle is run thereonto.

The bridge plate 25 is supported by angle irons similar to the angle irons 26 and 30 which are secured to elements of the side frame member N in the manner described hereinabove with reference to the support of the bridge plate 24 by elements of the side frame member M. The bridge plate 25 is also movable on the angle irons supporting the same in the same manner as that described hereinabove with particular reference to the bridge plate 24.

The frame member 29 that is supported at the top of the column C provides platforms for wheel supporting means and gauges as will be described hereinafter. This frame includes angle iron side frame members 35 and 36, Figs. 5 and 8, which are arranged to have the horizontal flanges thereof extended in opposite directions. A channel iron 37, Figs. 5 and 6, extends between the forward ends of the channels 35 and 36 and is suitably welded thereto and affords the front end member of the frame 29. Another channel iron 38 extends between and is welded to the channels 35 and 36 at the rear ends thereof and affords the rear end member of the frame 29, the angle iron 30 being welded to this member. As best shown in Fig. 5, the vertical flange of the channel 35 extends across the outwardly disposed face of the channel 13 and these channels are suitably interconnected, as by being welded one to the other. Likewise, the vertically disposed flange of the channel 36 extends across the outwardly disposed face of the channel 14 and these channels are welded or otherwise suitably secured together. These just described interconnection secure the platform 29 at the top of the column C.

A carriage 39 is supported for transverse slidable movement on the frame 29. This carriage comprises side plates 40 and 41, Figs. 5 and 8, an end plate 42 that extends between the forward ends of the plates 40 and 41, and another end plate 43 that extends between the rear ends of the side plates 40 and 41. As best shown in Figs. 6 and 8, the end plates 42 and 43 and the side plates 40 and 41 are afforded by flat strips and abutting ends of these members are interconnected one with the other as by being welded. A brace 44 extends between the side plates 40 and 41 and is welded thereto substantially midway between the end plates. The carriage 39 includes a top plate 56 which rests on and which is welded to the upper edges of the plates 40, 41, 42 and 43 whereby a platform is provided which is utilized in the manner to be explained presently.

As stated, the carriage 39 is mounted for transverse slidable movement on the frame 29 and to this end channel irons R and S are extended between the side plates 40 and 41 substantially midway between the end plate 43 and the brace 44. These channel irons are spaced from the bottom of the plate 56 and these channels are spaced one from the other so that the free edges of the horizontal flanges thereof are arranged in spaced apart relation. Thus an open bottom guideway is afforded on the carriage 39 and the head portion 47 of a clamp bolt 48 is disposed in this guideway.

Channel irons 50 and 51 extend between and are welded to the side plates 35 and 36 of the frame 29, and these channel irons have the vertically disposed flanges thereof spaced apart one from the other to thereby afford a guideway G. As best shown in Fig. 6, the guideway so afforded is aligned with the open bottom of the guideway afforded by the channel iron members R and S so that the body 48 of the clamping bolt may be passed through the guideway G. A hand wheel 52 is mounted on the threaded lower end of the bolt 58 and when this hand wheel is run inwardly on the threaded end of the bolt 48 it moves into engagement with the lower ends of the vertical flanges of the angle irons 50 and 51 to thereby be effective through the head 47 to draw the horizontal proportions of the flanges R and S into engagement with adjacent portions of the horizontal flanges of the channel irons 50 and 51. When the hand wheel 52 is tightened in this position the carriage 39 is secured in a selected position on the frame 29.

The carriage 39 is movable transversely on the frame 29 so that this carriage may be moved into alignment with the bridge plate 24 when the bridge plate has been located in an adjusted position to receive the wheel of a vehicle to be worked upon. In order to permit such movement of the carriage 39, the hand wheel 52 is withdrawn from engagement with the lower edges of the vertical flanges of the angle irons 50 and 51 and this frees the carriage 39 to permit movement thereof into the proper position. The carriage 39 is guided in such transverse movement by having the end member 43 thereof engaged with an adjacent face of the angle iron 30 and the end member 42 is engaged with the inner face of the plate 55 that is welded or otherwise suitably secured to the vertical flange of the channel 37, as shown in Fig. 6.

When the carriage 39 has been disposed in a selected position the hand wheel 52 is tightened. Thereafter the wheel of a vehicle may be passed over the bridge plate 24 and onto the carriage 39. When the camber and toe-in of the front wheels of an automotive vehicle are to be adjusted, it is advantageous to rest a turntable as T on the top plate 56 of the carriage 39. This turntable may be of the nature of that disclosed in the patent to Bennett No. 2,250,742, patented July 29, 1941. Such a turntable affords a universal movement in a horizontal plane and this facilitates adjusting the camber and toe-in of the front wheel of a vehicle that is rested on the turntable T.

As best shown in Fig. 6, the brace 44 is of a greater height than the side and end members 40, 41, 42, and 43. A further brace 53 is disposed inwardly of the end wall 42 and is of a height corresponding to the height of the brace 44, as is shown in Fig. 6. A sheet metal plate 54 is disposed on the upper edges of the braces 44 and 53 and this plate is welded to these edges to thereby be retained in position. This plate includes depending flanges that close the space between the plate and between the braces 44 and 53. The plate 54 affords a support on which a toe-in gauge or the like may be mounted when a wheel adjustment is being effected.

Figure 1:
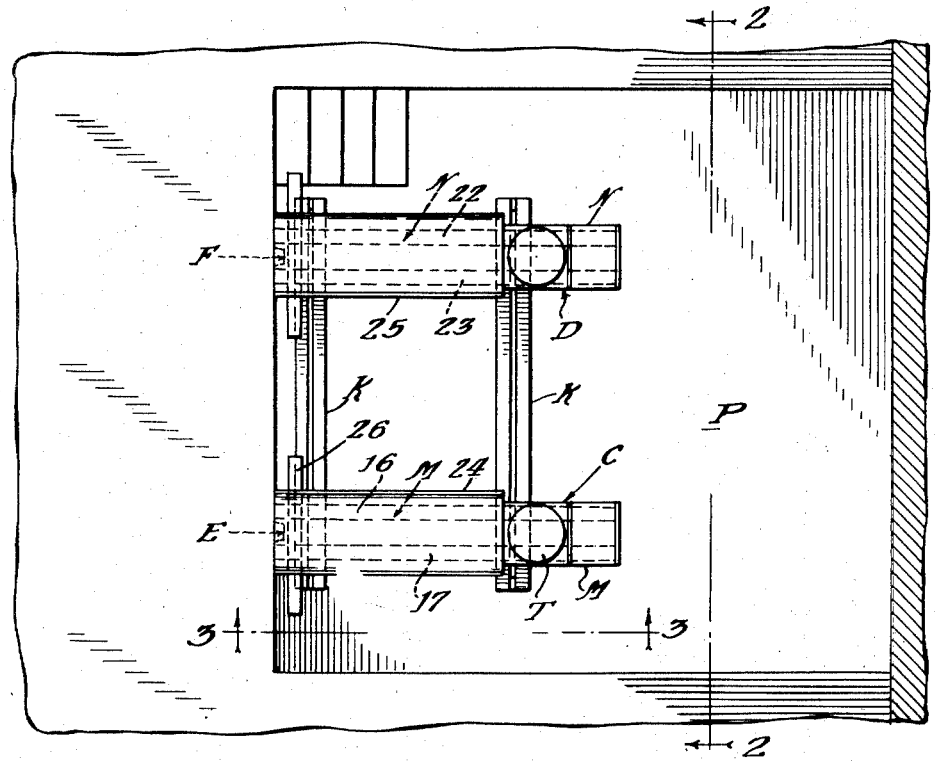
Fig. 1 is a plan view of my novel apparatus mounted in a pit and in which certain parts are broken away.

The side frame members M and N afford supports for tool beams such as K which are rested on and extended between and beyond the members M and N as shown in Fig. 1. These beams may be in the nature of that disclosed in my co-pending application, Serial No. 200,004, filed concurrently herewith. In the drawings I have shown two beams as K, but it will be understood that a greater or lesser number could be employed depending upon the nature of the work to be performed on my apparatus.

Each beam as K comprises a pair of channel irons 57 and 58 which have the flanges thereof extended in opposite directions. The flat faces of these channels are maintained in spaced apart relation by having a block as 64, Fig. 5, inserted therebetween, one such block being provided at each end of the channels. The blocks as 64 are welded in position whereby the channels 57 and 58 are secured together and the area between adjacent faces of these beams affords a tool-receiving space. Thus, as it is understood in the art, one end of a suitable upright may be extended into the tool-receiving space to be detachably connected to the beam. A plurality of such uprights may be used and certain of these uprights will engage portions of the frame on which an operation is to be performed and others will afford a support for supplying means such as a hydraulic jack or the like.

In some instances the beams as K will merely rest on the side frame members M and N, but in other instances it will be necessary that the beams be secured against movement relative to the frame members as M and N. This may be effected by utilizing a retaining tool such as that generally indicated by 60 in the accompanying drawings. Each tool as 60 includes an elongated substantially rectangular body 66 having a substantially T-shaped head 62 at one end thereof. The branches of the head 62 preferably include portions extended inwardly toward the main body 66 so as to thereby provide toe portions, one of which as shown in Fig. 7, may be engaged beneath a flange on a channel iron as 16. In order to connect the tool 60 to the beam as K, a pin as 61 is passed through aligned openings in the channel members 57 and 58 and through an opening provided in the body 66 of the tool 60. Then with one of the toe portions engaged with the flange of a channel as 60, a wedge as 63 is passed between the other toe portion of the head 62 and the adjacent edge of the beam as K and this wedge is driven into position whereby the tool 60 is tightly clamped to both the channel iron as 16 and the beam as K to secure the beam to the side frame member M.

In Fig. 7 I have shown one tool 60 in the position designated by X so that it is disposed outwardly of the member as M. I have shown another tool 60 in position Y and this tool is connected to the beam as K in the manner described hereinabove, but in this instance the toe portion of the head 62 of the tool is engaged with a flange of the channel iron 17. When the tools X and Y are firmly clamped to the beam K and the channels 16 and 17, the beam K is held against movement relative to the side frame members M and N.

It may not always be advantageous to connect two tools as 60 to only one of the side frame members, as is illustrated in Fig. 7, for in some instances it will be advantageous to mount a tool as 60 outwardly of the beam N while another tool is mounted in the position X. Such tools, when tightened in position, are effective to prevent movement of the beam as K relative to the side frame members M and N.

It may be that a tool beam as K will not include openings as 68 through a set of which the pin 61 is passed, as described hereinabove. Hence, I provide an opening 64p near the free end of the body 66 and when the toe portion of a head 62 is engaged with the flange of a channel as 16 and the body 66 is passed through the tool-receiving space, then the end portion thereof including the opening 64p is disposed above the upper surface of the beam K. A pin as 61 may then be passed through this opening to rest on the upper edge of the beam K. Such a pin when tightened by the driving in of a wedge as 63 will serve the same purpose as the pin 61 passed through a set of openings as 68.

It has been explained hereinabove that the front wheels of a vehicle may be placed upon the turntables as T respectively associated with the beams M and N in the manner described hereinabove. Under such circumstances it may be advantageous to place a beam K directly beneath the axle or other support for such wheels and the beam K shown in full lines at the right-hand side of Fig. 3 is disposed approximately in such position. It is possible to move the beam K into such a position because of the overhang of the frame 29 inwardly of the column C.

Moreover, the frame 29 extends forwardly of the column C so as to thereby provide an overhanging portion, and if it should be desired to work upon the front end of a frame of a vehicle including wheels rested on the turntables T, then a beam as K may be mounted in the broken line position indicated by W in Fig. 3, such beam being rested upon the portions of the side frame members M and N that extend forwardly of the columns C and D.

The arrangement illustrated in the accompanying drawings is of sufficient length, as is shown best in Figs. 3 and 4, to enable operations to be performed on at least the front half of an automotive vehicle of which the front wheels are disposed on turntables as T or the platform as 39.

When it is necessary to operate on the rear half of an automotive vehicle, then the rear wheels of the vehicle are caused to pass over the bridge plates 24 and 25 to come to rest on the turntables as T. This enables operations to be performed on at least the rear half of the frame of an automotive vehicle.

It will be manifest from the foregoing description that I have provided an arrangement which will enable the hereinabove set forth and kindred objects of this invention to be realized, and while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In an apparatus of the kind described, a pair of spaced apart frame members at least one of which includes a longitudinally extending and horizontally projecting edge portion, a tool beam rested upon and extended transversely between the side frame members for sliding movement longitudinally and transversely thereto, and a retaining member adapted to clamp the beam in a selected position on the frame members, means pivotally mounting said retaining member on said beam at a point adjacent said edge portion, a toe element on the retaining member in position to clampingly engage the underside of said edge portion when said retaining member is pivotally moved theretoward, and another toe element on the retaining member adapted to receive a wedge for wedgingly engaging the underside of said beam to hold the first-named toe element in said clamping engagement.

2. Apparatus according to claim 1 in which said beam is formed with a plurality of horizontally aligned openings defining a plurality of selected positions at which said retaining member may be pivotally mounted to said beam, and in which the retaining member is formed with an opening adapted to be registered with a selected one of the openings in said beam, said retaining member being pivotally mounted to said beam by a pin passed through said registered openings.

3. Apparatus according to claim 1 in which said means for pivotally mounting said retaining member includes a pin passed through said retaining member and pivotally mounted on said beam.

4. In an apparatus of the kind described, a pair of spaced apart frame members at least one of which includes a longitudinally extended flange projecting therefrom in a horizontal plane, a tool beam rested upon and extended transversely between the side frame members for sliding movement longitudinally and transversely relative to said frame members, a retaining member mounted in said beam for pivotal movement toward and away from a clamping position with respect to said flange, a toe element at one end of the retaining member adapted to clampingly engage the underside of said flange upon pivotal movement of said retaining member toward said flange, to assume said clamping position, and another toe element on the retaining member configured to receive a wedge for wedgingly engaging the underside of said beam to hold said retaining member in said clamping position at the underside of said flange.

5. In an apparatus of the kind described, a pair of spaced apart frame members at least one of which includes a flange-like projection extended in a horizontal plane, a tool beam rested upon said frame members for sliding movement transversely and longitudinally relative thereto, and a retaining member adapted to clamp said beam in a selected longitudinal and transverse position on said frame members, said retaining member being mounted on said beam for pivotal movement toward and away from a clamping engaging position with respect to flange-like projection, a toe element on the retaining member for thus clampingly engaging said flange-like projection to hold said beam in said selected position, and another toe element on the retaining member located opposite the first-named toe element and having a wedge-receiving slot being so located and configured, in relation to the underside of said beam, that when the first-named toe element assumes said clampingly engaging position a wedge may be inserted in said slot to wedgingly engage the underside of said beam to hold the retaining member in said clamping position.

JESS L. ELAM.

References Cited in the file of this patent

UNITED STATES PATENTS

| Number | Name | Date |
|---|---|---|
| 1,777,686 | Bagge | Oct. 7, 1930 |
| 2,070,150 | Venzie | Feb. 9, 1937 |
| 2,233,458 | Segre | Mar. 4, 1941 |
| 2,445,397 | Horton | July 20, 1948 |
| 2,442,425 | Merrill et al. | June 1, 1948 |